UNITED STATES PATENT OFFICE.

GUSTAV MAGNUS, OF BERLIN, GERMANY.

IMPROVEMENT IN COMPOSITIONS FOR BILLIARD-BALLS AND PROCESSES OF MANUFACTURING THE SAME.

Specification forming part of Letters Patent No. 180,484, dated August 1, 1876; application filed March 6, 1876.

*To all whom it may concern:*

Be it known that I, GUSTAV MAGNUS, of Berlin, Kingdom of Prussia, German Empire, have invented an Improved Process of Making Billiard-Balls of Vulcanized India-Rubber, of which the following is a specification:

My invention accomplishes an object long sought without success, namely: To make billiard-balls of vulcanized india-rubber, which answers the most rigid claims on such balls. My balls are uniformly solid throughout, without any pores or cavities. They are perfectly elastic. They rebound to a height of eighty feet if thrown on an iron plate. Their center of gravity is exactly in the center of the ball, so that they lie still in any position on a surface of quicksilver. They do not crack or peel off, and they do not lose their color.

Heretofore it has not been possible to manufacture rubber balls which fulfilled all these requirements. They did not reach even the balls made from ivory, which are considered to be the best, notwithstanding that they do not come up to the standard of perfection. They are hard and elastic, it is true, but after some use they lose their color, being dyed only on the surface. They crack or peel off. In most cases their center of gravity does not coincide with the center of the ball itself, as the quicksilver bath will prove, and consequently they do not run true. Lastly, they are expensive.

The way in which rubber balls are now made is to cure or bake india-rubber, mixed with sulphur, and with less than fifty per cent. of other different substances, for a short time, varying from one and one-half to three hours; but the result has been always to produce an inferior fabric, as above stated, not even reaching the quality of ivory balls. After many expensive trials and experiments I have succeeded in producing first-rate balls. The manner of making them is as follows:

The ingredients are rubber, sulphur, a suitable coloring matter, and heavy spar, or sulphate of baryta, the latter in a quantity at least fifty per cent. of the rubber.

The mixing is done in the usual way. After having made a ball, as nearly true as possible, and about one-half inch smaller than the finished ball, it is enveloped in a sheet of the same mixture, having the required color, of three-eighths of an inch thickness, and put in a very strong metallic mold of adequate form. The whole is then submitted to the curing-process during at least ten hours, commencing with a low temperature, and increasing it slowly but steadily. The mixture is exposed only for one hour, or less, to the highest degree of heat, which will vary according to the quality of the india-rubber used. The cured balls are then turned and finished.

I am well aware that the vulcanizing and curing of india-rubber is known; also that billiard-balls have been made of such rubber, but of an inferior or worthless quality. Only by following closely the above-described process is it possible to make first-rate billiard-balls.

What I claim as my invention is—

1. The composition for billiard-balls consisting, essentially, of india-rubber, sulphur, sulphate of baryta, and coloring matter, substantially as set forth.

2. The process of manufacturing billiard-balls, of the above-claimed composition, consisting, essentially, of inclosing them in strong metallic molds of the required form, then submitting them to a slowly-increasing heat for a period of ten hours or more, and, finally, turning and finishing them, substantially as specified.

This specification signed by me in presence of two witnesses this 12th day of January, 1876.

GUSTAV MAGNUS.

Witnesses:
 HERMANN KREISMANN,
 WENCESLAUS KLEERODER.